H. HERZBRUCH.
WATER FILTER.
APPLICATION FILED JUNE 26, 1913.
1,141,959.
Patented June 8, 1915.
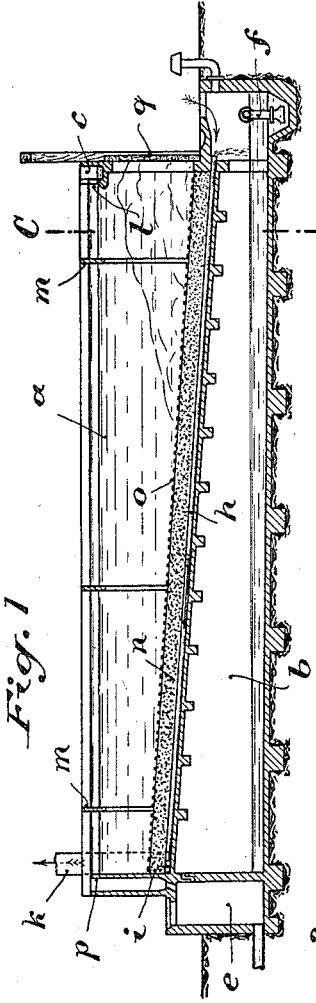
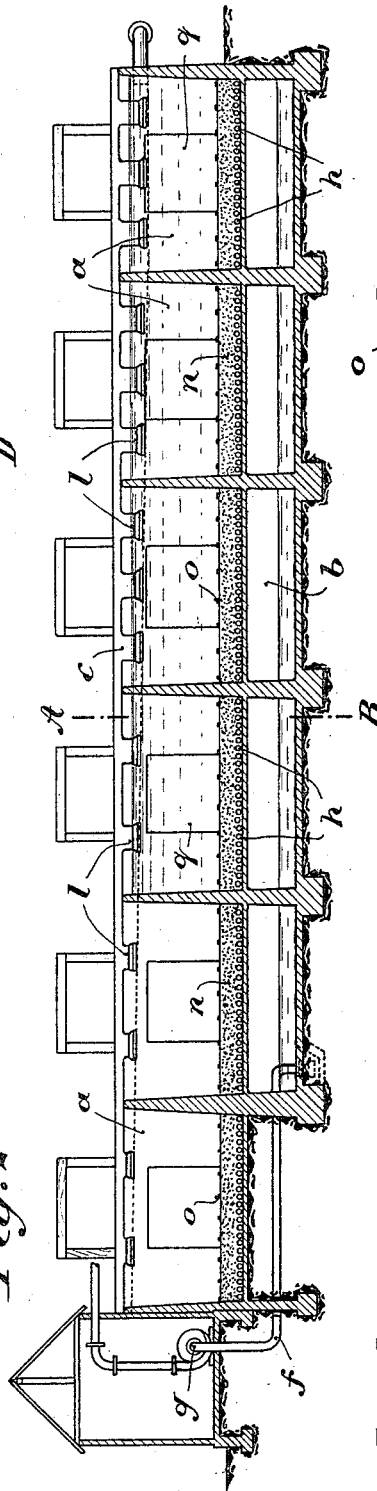
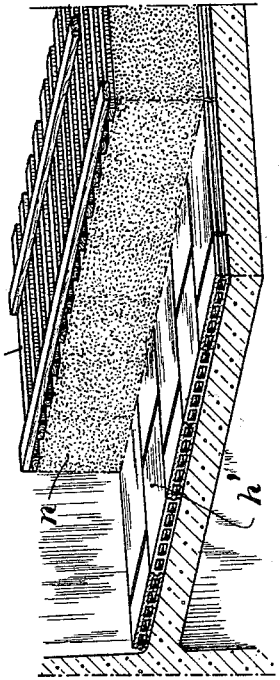
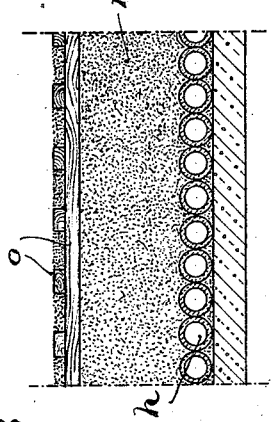

UNITED STATES PATENT OFFICE.

HUGO HERZBRUCH, OF DATTELN, GERMANY.

WATER-FILTER.

1,141,959.  Specification of Letters Patent.  Patented June 8, 1915.

Application filed June 26, 1913. Serial No. 775,833.

*To all whom it may concern:*

Be it known that I, HUGO HERZBRUCH, builder, residing at 7 Lloydstrasse, Datteln, in Westphalia, Germany, have invented certain new and useful Improvements in Water-Filters, of which the following is a specification.

The object of the invention is to provide an improved filter for purifying water.

My invention enables very impure water to be filtered in one operation, without preliminary purification. This is attained by arranging for a continuous uniform emission of the water from the entire under-surface of a filter bed consisting of finely granular, dense material, such as sand or the like, the percolated water beneath the filter bed being caused to freely pass away laterally.

According to my invention the use of layers of coarser gravel, which in any case fail to hold back the finer material, and on the other hand offer too much resistance to the lateral outflow of water, is dispensed with. In lieu thereof a carrier of a porous character is provided, which has the property of preventing the entrance of even the finest granules of the upper filtering bed above. The carrier, which is made of unglazed clay or other similar, natural or artificial material, is sufficiently strong to allow of forming therein channels or connected basins serving for the free discharge of the water, or as containers for purified water. In this manner I secure uniform passage of the water in parallel streams through the close grained filter bed, without risk of the filter failing to act efficiently even when working under severe conditions, and the free exit of the water laterally is unimpaired.

The following are four of the main advantages obtained: 1. The fine grained filtering material is firmly supported on the rigid carrier, so that the bed is not disturbed. 2. The porosity of the filter carrier allows the water to percolate over the entire area of the bed, so that uniform conditions of percolation obtain everywhere. 3. The filtering material prevents the choking of the pores of the filter carrier with mud so that the carrier is always in good condition. 4. The interconnected spaces provided in the filter carrier allow free discharge of the percolated water.

The invention is illustrated in the accompanying drawings, in which:—

Figure 1 is a section on the line A—B of Fig. 2, Fig. 2 being a cross section of the line C—D of Fig. 1, these two figures representing a filtering installation comprising a plurality of chambers; Fig. 3 is a view of a detail, to a larger scale, and Fig. 4 is a perspective view of a modification.

Underneath the filtering chambers $a$, arranged side by side, there are cavities or chambers $b$, which serve as containers for purified water. Along one end of the filter chambers there is a feed channel $c$ and at the other end there is an overflow weir $p$ which discharges into a shaft $e$. Water overflowing into the shaft $e$, which has to some extent been previously purified by precipitation, can be used or taken to the filter again or be allowed to escape. The several interconnected water containers $b$ are connected to a pump $g$ by a suction pipe $f$, said pump serving to deliver the pure water into a reservoir, or to supply pipes or the like. On the floor of each filtering chamber there is a system of drain pipes $h$, which at one end communicate with the containers $b$ and at the other end communicate with transverse conduits $i$, which are connected to vent shafts $k$. Resting on said layer of drain pipes $h$, and inclosing the latter is the filter layer $n$ of fine grained material, preferably sand, said layer being of approximately uniform consistency from top to bottom and approximately 15 to 20 cm. high. The impure water flowing into the filtering chamber percolates through the filtering bed, the whole area of which affords a practically uniform degree of percolation. The filtered water penetrates into the drain pipes, and immediately flows away laterally. As the pores in the drain pipes are smaller than the smallest particles of the filtering mass, these particles do not enter the pipes, and on the other hand the close grained filtering layer prevents the pores from becoming clogged with mud. Instead of using drain pipes I may use other suitable bodies, such as the hollow clay tiles $h'$ shown in Fig. 4, to serve as carriers for the bed of fine grained material, the cavities in said tiles forming the channels for the discharge of the water. Any material may be used, which has sufficient porosity, and is capable of supporting the load thereon and of affording free outlet for the water.

By virtue of the strength of the structure the filter is capable of supporting a large head of water; for example the above mentioned filtering bed, 15 to 20 cm. high, is capable of carrying a 6 m. head of water without being damaged. Owing to the fact that the water enters the drain pipes in a very finely distributed condition, the filtering is accompanied by a biological purification, by virtue of natural ventilation. The action of the air on the finely distributed water is extremely vigorous. This action can be greatly increased by introducing to the cavities, instead of air, ozone or other germ destroying or deodorizing substances. If it is desired to subject the substances, held in the filtered water in solution, to other chemical action, this may be effected by introducing gaseous, pulverized or liquid substances into the water by means of the drain tubes $h$. In biological purifications, so-called biological substances are used, such as formations of coke particles, etc., which are overflown by the liquid and are then subjected to the influence of the atmosphere. Owing to this alternating or simultaneous action, a so-called biological clarification is produced, inasmuch as the dissolved fine organic substances present in the water, are divested of their organic character. Such a biological clarification may be obtained to a marked extent, by my apparatus, if, during operation, an effective aeration of the drain tubes is produced. Here the drain tubes will constitute the biological body, permeated by water, in a finely divided state, so that under simultaneous aeration, the above described process will take place. If in place of air, chemically acting gases or liquids are admitted, to the drain tubes, corresponding actions, operating in a similar manner will occur, the point being that the drain tubes, are not submerged in backwater but that they permit a free water discharge.

The bottom of the filtering basin is preferably inclined as shown in Fig. 1, so that the water has a natural flow from the filter bed. Another object of the slope of the floor is to have varying depths of water in the filters, so that a layer of mud, gradually increasing in depth from one side to the other, is formed. The layer of mud deposited is of course approximately proportional in thickness to the head of water over it, that is to say most mud collects where the water is deepest. Hence, as most of the mud collects at one part of the filter, namely the deepest part, a considerable area of the filter remains operative for a long period. The floor of the filter is hereby preferably arranged to slope downward toward the intake end, as the water entering at this part contains the most mud. The filter layer $n$ is of substantial uniform depth, so that its action is uniform and that its surface has a slope conforming to that of the drain tubes $h$.

In order to prevent the filter from being disturbed when cleaning out the mud (this being effected by opening the sluices $q$) a grid $o$ made of bars of wood or any other non-rusting rigid material is placed on the filtering bed. This grid, while offering very little resistance to the percolation of the water, forms a fixed division between the filter bed and the layer of mud above it, and thus protects the bed from damage by the shovels when the mud is being removed. The grid also enables workmen to walk over the filter bed, and enables residual impurities, not removed with the mud, to be removed by scratching away sand between the grid bars, and renewing the surface of the bed at the parts thus treated.

By providing a row of basins or chambers with a common feed conduit, which can be disconnected from individual basins while removing the mud, a continuous supply of purified water can be obtained. The special method of operation also enables the impure water to be automatically distributed to the several basins, this being effected as follows: The trough shaped feed channel communicates with the several filtering chambers or basins by means of gates or closable openings, for instance by the weirs $l$. The level of the supply channel is such that the outflow level of the basins corresponds with the highest water level in the supply channel, due regard being had to the fall, both in the basin and supply channel. The inflow weirs of the several chambers rise to different levels as shown in Fig. 2, so that the height of the overflow edges gradually increases in the sequence in which the chambers are to be fed. This has the following result: Water supplied by the supply channel first flows into that basin which has the lowest inflow weir, and the other basins are not fed. When the basin to which water is supplied fails to perform its filtering operation, owing to the accumulation of an excessive quantity of mud, the water rises gradually in this basin until it is level with the next highest weir, of the second basin. Consequently the water ceases to flow into the first basin, and is supplied to the second basin, until the same conditions occur in the latter, so that all the basins are used in turn. The level of the outflow at $p$ for all the basins being equal to the highest water level in the supply channel, the basins first filled cannot possibly overflow in the normal course. If the supply of impure water exceeds the capacity of the filtering plant, all the basins fill up level with the supply channel, that is to say level with the outflow.

Thereafter, water cleansed by the depositing of mud begins to flow out of all the basins simultaneously, floating matter being retained by any convenient device, for instance by boards *m*. The supply in all the basins is then perfectly uniform, whereby the purifying action, by settling, is considerably improved.

The installation, although primarily adapted for use as a filtering installation, can consequently be used simultaneously as a series of precipitating or settling beds, and the constant, simultaneous suction due to the filtering action greatly assists the purification by precipitation.

What I claim as my invention and desire to secure by Letters Patent of the United States is:—

1. A filtering installation comprising a porous filtering bottom, a layer of filtering granules supported on said bottom and a rigid grid supported on the filtering granules.

2. A filter for clarifying water, consisting therein that a filtering layer of finely granulated, dense material such as sand or the like, rest on a support the porosity of which allows water to pass therethrough, a plurality of filter beds being arranged side by side with supply conduit common to all but with inlets from said supply conduit at different levels.

3. A filter for clarifying water, consisting therein a filtering layer of finely granulated, dense material, such as sand or the like rests on a support the porosity of which allows water to pass therethrough, a plurality of filter beds being arranged side by side with supply conduit at different levels, the outlets from the several beds being all at the height of the highest water level in said supply conduit.

HUGO HERZBRUCH. [L. S.]

Witnesses:
HELEN NUFER,
ALBERT NUFER.

Copies of this patent may be obtained for five cents each, by addressing the "Commissioner of Patents, Washington, D. C."